United States Patent [19]

De Franco et al.

[11] Patent Number: 4,478,321
[45] Date of Patent: Oct. 23, 1984

[54] SYNCHRONIZER MECHANISM

[75] Inventors: Philip N. De Franco; Henry F. Jones, Jr., both of Schenectady, N.Y.

[73] Assignee: Massey-Ferguson Services N.V., Curacao, Netherlands Antilles

[21] Appl. No.: 341,034

[22] Filed: Jan. 20, 1982

[51] Int. Cl.$^3$ .............................................. F16D 23/06
[52] U.S. Cl. .................................. 192/53 E; 192/53 F
[58] Field of Search ............................ 192/53 E, 53 F

[56] References Cited

U.S. PATENT DOCUMENTS

| | | | |
|---|---|---|---|
| 2,221,893 | 11/1940 | White | 192/53 F |
| 3,078,975 | 2/1963 | Eaton | 192/53 E |
| 3,695,403 | 10/1972 | Eastwood | 192/53 F X |
| 3,910,390 | 10/1975 | Eichinger | 192/53 E |
| 4,018,319 | 4/1977 | Thomas | 192/53 E |

FOREIGN PATENT DOCUMENTS 1385860  12/1964  France ............................. 192/53 F

OTHER PUBLICATIONS

"Manual Transmission Synchronizers"; Socin, Chrysler Corp; Walters, Chev. Motors Div., GM.

Primary Examiner—Rodney H. Bonck
Attorney, Agent, or Firm—John C. Thompson

[57] ABSTRACT

A blocking pin type synchronizer having a high torque to volume ratio. The synchronizer includes two synchronizer cones (42) held apart by blocking pins (40). Disposed between the cones (42) are spring assemblies (62) of novel construction, each spring assembly including a rectangular spring housing (64), a base plate (66), and a pair of opposed leaf springs (68). The housing has opposed slotted side walls (82). The base plate and the springs are each provided with tabs (92), (98) received within the slots for maintaining the base plate and springs in a centered position. The springs hold the spring housing and base plate apart. The cones are provided with recesses (88), surfaces (86) of the base plate being biased into contact with radial outer surfaces of the recesses (88) to maintain the spring assemblies from rotation.

6 Claims, 5 Drawing Figures

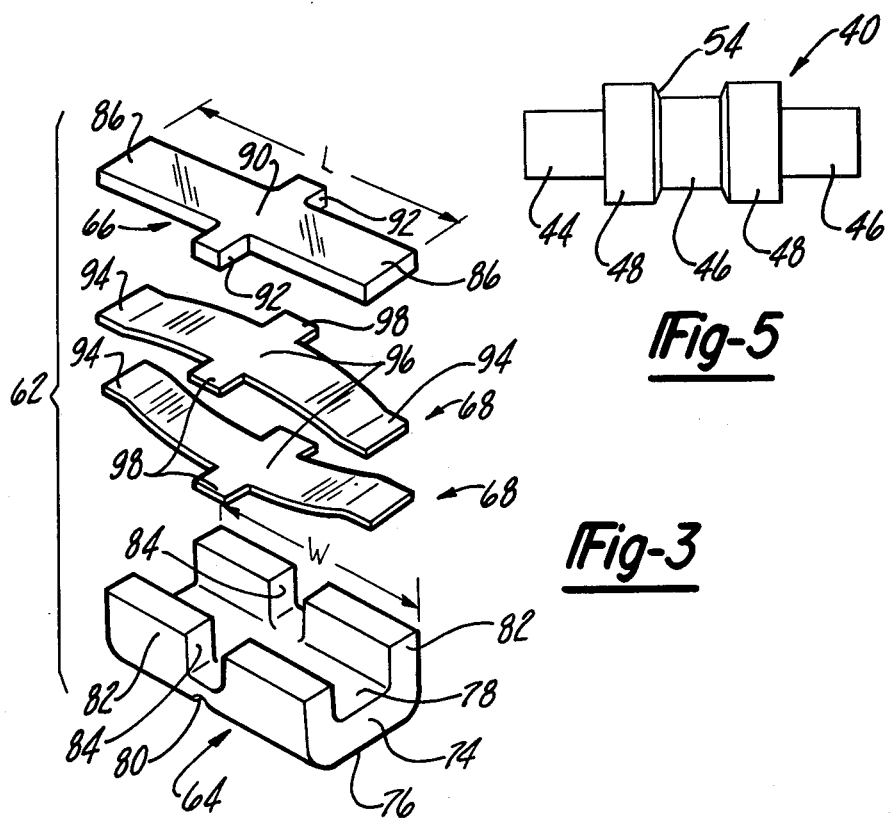
*Fig-3*
*Fig-5*
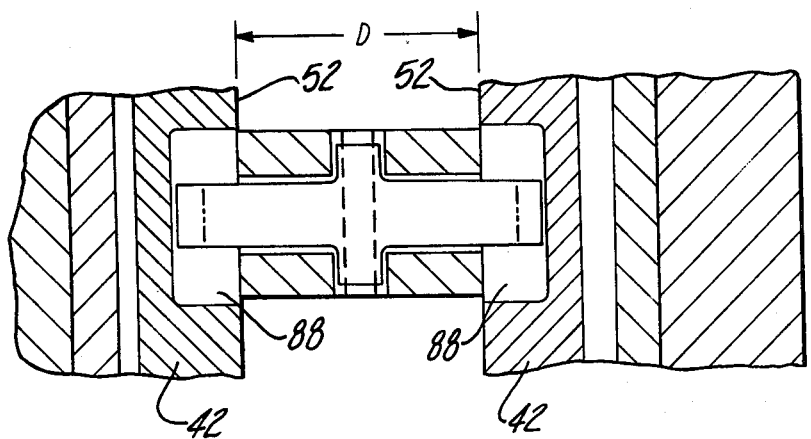
*Fig-4*

SYNCHRONIZER MECHANISM

TECHNICAL FIELD

The present invention relates generally to a synchronizer mechanism, and more particularly to a synchronizer of the type employing blocking pins.

PRIOR ART

The synchronizer assembly of this invention is usable with a constant mesh gear transmission of the shift collar type. Such a transmission customarily includes parallel shafts on which are mounted intermeshing gears. Customarily, one of the intermeshing gears is fixed to the shaft on which it is mounted while the other intermeshing gear is journalled about its associated shaft. When it is desired to drive through a pair of intermeshing gears, the journalled gear is coupled to the associated shaft by means of a shift collar or sliding sleeve which is laterally shifted to cause internal splines on the sliding sleeve to engage both the external splines on a drive hub and clutch teeth on the gear. In order to prevent clashing of gears, specifically the internal splines on the sliding sleeve and the clutch teeth on the gear, a synchronizer is employed to insure that either the sliding sleeve or gear is accelerated (either positively or negatively) to the same speed as the other. (The location of the synchronizer within the transmission will determine whether the gear or the sliding sleeve is accelerated to match the speed of the other. In the following, it will be assumed that the sliding sleeve will be accelerated.) While various types of synchronizer mechanisms are known, they all operate on the same basic principle. Thus, the synchronizer includes a clutch surface which is capable of engaging a corresponding clutch surface carried by the gear. When a shift is initiated, the two clutch surfaces are brought into engagement with each other and the sliding sleeve is accelerated to the same speed as the gear. A mechanism prevents completion of the shift until the sliding sleeve has attained substantially the same speed as the gear.

The present invention relates to a synchronizer assembly of the type generally referred to as a blocking pin synchronizer. This form of synchronizer is generally well known in the art, and representative designs are shown in U.S. Pat. Nos. 3,078,975 issued Feb. 26, 1963, 3,910,390 issued Oct. 7, 1975, and 4,018,319 issued Apr. 19, 1977. All of these designs have the following in common: The gear assemblies which are to be synchronized are journalled about a shaft, and include clutch teeth rotatable with the gear and a clutch member having a conical clutch surface. Each of the synchronizers include a shift collar or sliding sleeve having a plurality of apertures. In addition, two additional clutch members having conical clutch surfaces cooperable with the clutch surfaces on the gear assemblies are coupled together by blocker pins which pass through certain of the apertures in the sliding sleeve. Spring assemblies which govern the synchronizer action, also pass through other certain apertures in the sliding sleeve and are interconnected with the cones. The spring assemblies of the prior art include two semicylindrical members having springs disposed between them. While these prior art designs are generally satisfactory, it is desirable that a synchronizer be provided having a higher capacity within a given volume than the prior art, which synchronizer will have an acceptable service life. In addition, the known prior art designs utilize close tolerance components which are difficult to machine.

OBJECTS AND SUMMARY OF THE INVENTION

It is an object of this invention to provide a high torque capacity synchronizer of the blocking pin type which is relatively inexpensive to manufacture.

The foregoing and other objects and advantages of this invention are accomplished by employing a blocker pin type synchronizer, a spring assembly of novel construction, which spring assembly is nonrotatably carried by the synchronizer cones in which the blocker pins are secured.

Thus, in accordance with this invention, each spring assembly includes a generally rectangular spring housing having radially outwardly extending opposed side walls, each provided with an intermediate slot, an elongaged base plate provided with opposed tabs received within the slots of the side walls of the rectangular spring housing, and a pair of leaf springs disposable between the base plate and the spring housing, each of the springs also being provided with tabs received in the slots of the side walls of the spring housing. The radially outer end surfaces of each of the base plates are maintained in contact with a radial outer surface of each of a plurality of relatively narrow slots formed in the synchronizer cones carried by the blocker pins.

By employing the foregoing construction there is no tendency for either the spring assembly to rotate about its axis, or for the springs to rotate relative to the base plate and spring housing. This construction therefore eliminates torsional shear stress components on the springs, since the spring housing, not the springs, resists rotational movement. Thus, the springs are only used in tension or compression and are not likely to take a permanent set. In addition, because the springs do not act in torsion, the spring force is more predictable, providing repeatable synchronizer action. As the slots which receive the base plate of the spring assembly are relatively narrow, and because of other constructional features, a maximum spring force is achieved in a minimum package volume leading to a greater torque capacity for a given size of synchronizer than other commercially available synchronizers of this type. In addition, the construction described above can be more readily manufactured than other prior art constructions.

The above construction and other details will become more apparent from the following detailed description taken in conjunction with the accompanying drawings in which a preferred form of this invention is illustrated.

BRIEF DESCRIPTION OF THE DRAWINGS

FIG. 3 is an exploded perspective view of the spring housing, base plate, and spring assembly.

FIG. 4 is an enlarged sectional view taken generally along the line 4—4 in FIG. 1.

FIG. 5 is a side view of a blocker pin.

DETAILED DESCRIPTION

Figure 1:
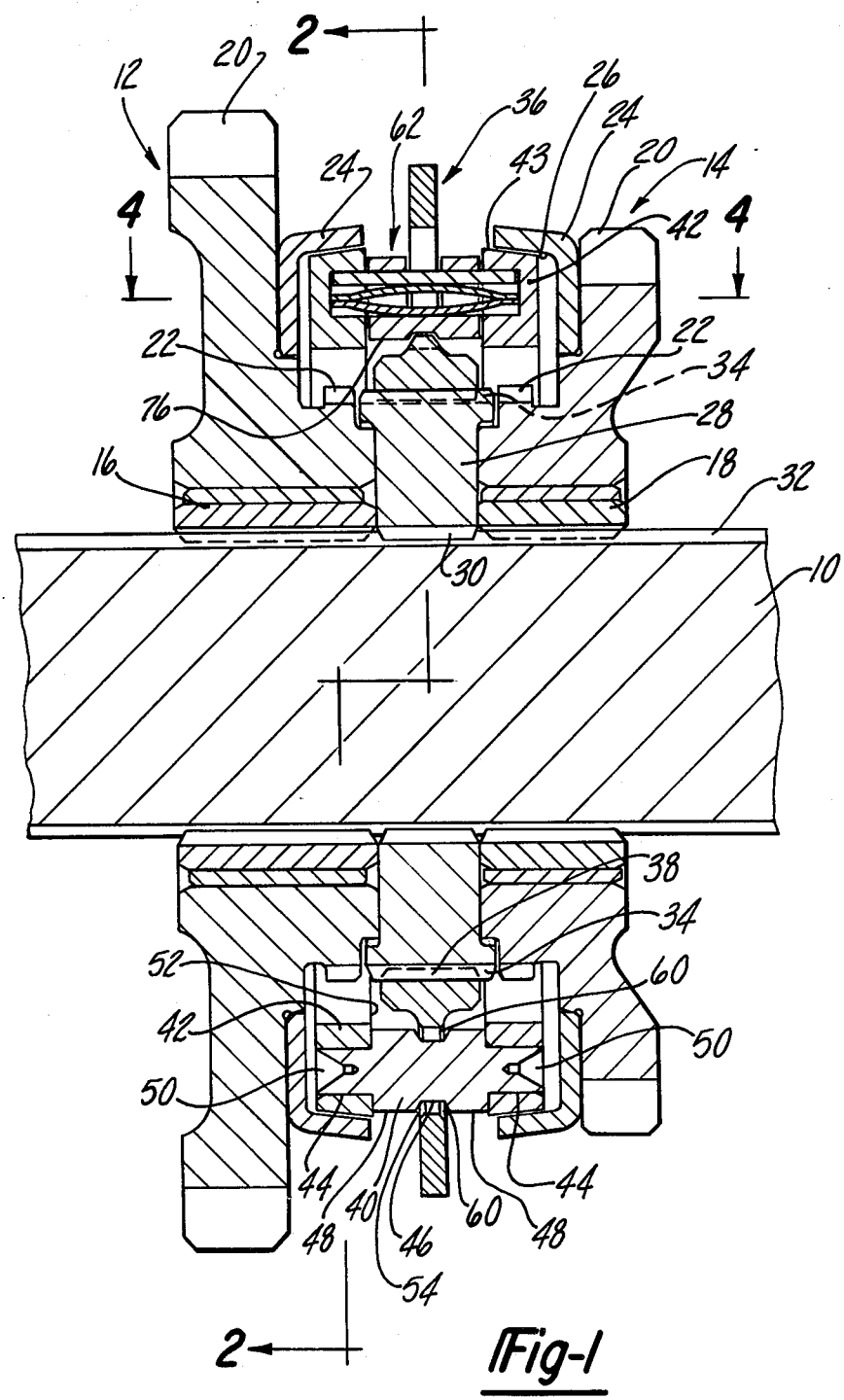
FIG. 1 is a longitudinal cross-sectional view of a synchronizer mechanism according to this invention.
Figure 2:
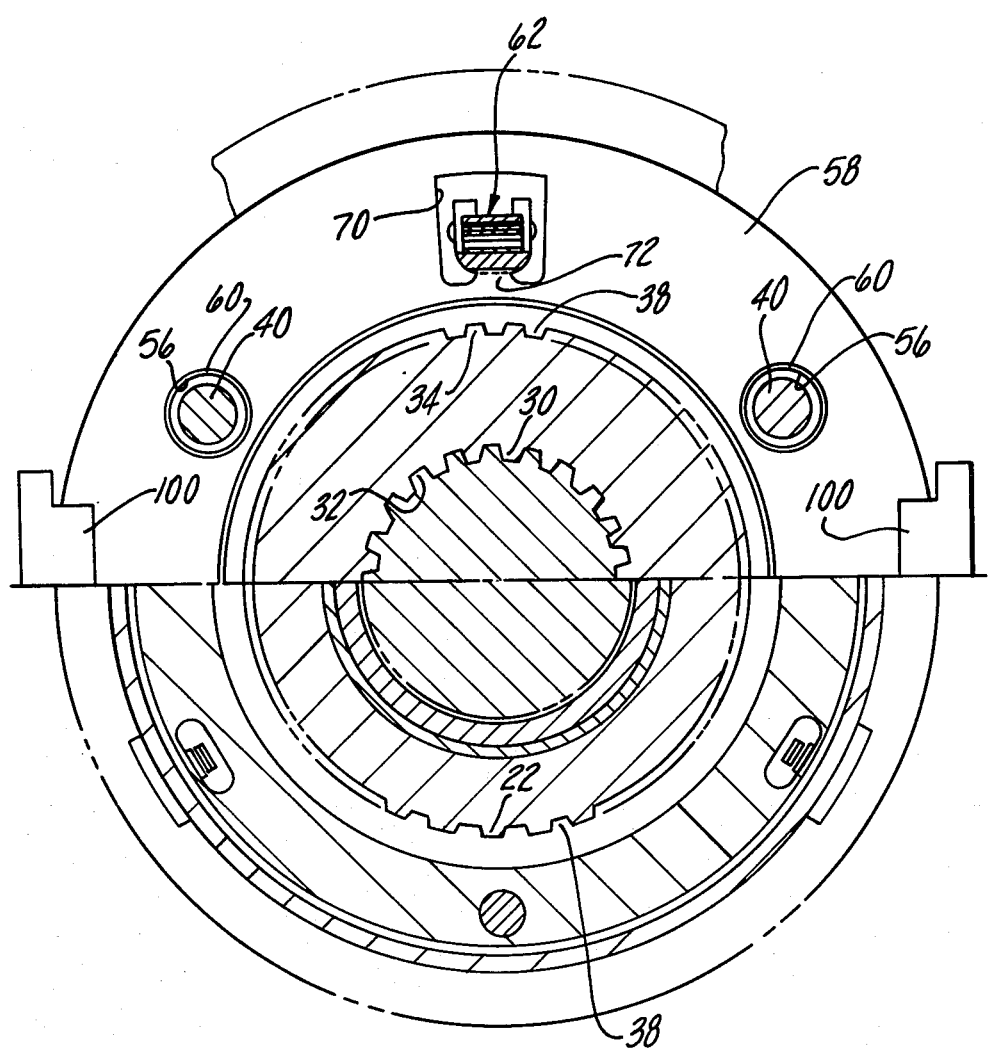
FIG. 2 is a section taken generally along the line 2—2 in FIG. 1.

Referring first to FIG. 1, a transmission shaft 10 is illustrated, a pair of gear assemblies indicated generally at 12 and 14 being rotatably mounted thereon. In the transmission, each of these gear assemblies is in constant mesh with another gear assembly (not shown) which is fixed to a further shaft parallel to the first shaft 10. Each of the gear assemblies 12, 14 is journalled on the shaft 10 by bearing sleeves 16, 18, respectively, and each gear assembly includes gear teeth 20 and clutch teeth 22. Also mounted on each of the gear assemblies 12 and 14 is a synchronizer ring 24 having an internal conical surface 26 disposed radially outwardly of the clutch teeth 22. The synchronizer ring is preferably secured to the adjacent portion of the associated gear assembly by means of electron beam welding to increase heat transfer characteristics.

Disposed between the gear assemblies 12, 14 is a drive hub 28, which hub is provided with internal splines 30 in driving relationship with external splines 32 on the shaft 10. The hub 28 is also provided with external splines 34. Mounted on the drive hub is an axially moveable shift collar or sliding sleeve, indicated generally at 36, this sliding sleeve being provided with internal splines 38 which are engaged by the external splines 34 on the drive hub 28. As is customary, the clutch teeth 22 can be placed in alignment with the external splines 34 on the hub, and the sliding sleeve 36 can be moved from a neutral position, such as shown in Fig. 1, to an engaged position wherein the internal splines 38 engage both the external splines 34 and the clutch teeth 22. The clutch teeth 22 and external splines 34 are provided with chamfered ends to assist engagement.

As is well known, if the hub 28 and the associated gear assemblies 12 or 14 are not rotating at the same speed, and if a shift were initiated by moving the sliding sleeve 36 from the neutral position to an engaged position, clashing of teeth would occur when the clutch teeth 22 started to contact the ends of the internal splines 38. To ensure that the sliding sleeve 36 is rotating at the same speed as the gear assembly which it is to engage, a synchronizer is provided.

The synchronizer of this invention includes, in addition to the sliding sleeve 36, and synchronizer rings 24, three cylindrical blocking pins 40 and a pair of annular synchronizer cones 42, each provided with an external conical surface 43 engagable with the corresponding internal conical surface 26 of the rings 24. Each of the blocking pins includes reduced end portions 44, a reduced central portion 46, and a pair of intermediate portions 48 disposed between the central portion 46 and the end portions 44. Each of the reduced end portions is countersunk as at 50 to facilitate the staking of the blocking pin 40 to the associated synchronizer cone 42, the reduced end portion being disposed within an aperture within the synchronizer cone 42, the shoulder between the reduced end portion 44 and the intermediate portion 48 abutting against a face 52 of the synchronizer cone 42. Chamfered portions 54 extend between the reduced central portion 46 and the intermediate portions 48. Each of the cylindrical blocking pins 40 passes through a cylindrical aperture 56 in an outwardly extending flange portion 58 of the sliding sleeve 36, a chamfered portion 60 being formed in the flange 58 adjacent the aperture 56.

The synchronizer additionally includes three spring assemblies 62, each spring assembly including a spring housing 64, a base plate 66, and a pair of opposed leaf springs 68, this structure being best illustrated in FIG. 3. The flange or disc portion 58 of the sliding sleeve is further provided with generally rectangular shaped apertures 70 which receive the spring assemblies 62. A protrusion 72 extends radially outwardly into each of the rectangular apertures 70.

Each of the spring housings is of a width W just slightly less than the distance D (FIG. 4) between the facing surfaces 52 of the synchronizer cones 42. Each spring housing 64 includes a base portion 74 having radially inner and outer generally parallel planar surfaces 76, 78, respectively. The radial inner surface 76 is provided with a transversely extending groove 80 which receives the protrusion 72 when the parts are in the neutral position as illustrated in FIG. 1. The spring housing further includes opposed parallel sides 82 which extend radially outwardly from the base portion at generally right angles thereto. Each of the sides 82 is provided with an intermediate slot 84.

The elongated base plate 66 is of a length L greater than distance D, the ends 86 being received in relatively narrow slots or recesses 88 formed in the synchronizer cones 42. An intermediate portion 90 of the base plate 66 is provided with outwardly extending tabs 92 which are received within the slots 84 for radial sliding movement. It should be noted that each of the slots or recesses 88 has an upper wall surface (no number) lying in a plane generally at right angles to the diameter of the cone, this surface being engaged by the corresponding surface of the end 86 of the base plate 66. Each of the leaf springs 68 is of a length similar to that of the base plate 66, each spring leaf being arched between flattened end portions 94, the intermediate arched portion 96 being provided with outwardly extending tabs 98 which are also received within the slots 84 for radial sliding movement. It should be obvious that the tabs 92 and 98 maintain the base plate and the leaf springs in a relatively centered position. When the parts are in the neutral position shown in FIG. 1, the springs 68 will hold the spring housing and base plate apart to maintain the outer surface of the ends 86 of the base plate in contact with the radially outer surface of the slots or recesses 88, and also to maintain the groove 80 in the spring housing 64 in contact with the protrusion 72. If the normal force of the springs 68 is not great enough, shims (not shown) may be inserted between one of the springs and the base plate 66.

OPERATION

When the gear assemblies 12 and 14 and/or drive shaft 10 are rotating the operation of the synchronizer of this invention is as follows: The selection of a particular speed gear is accomplished by the operator moving a gear shift lever (not shown) which in turn imparts an axial motion to shift fork pads 100 through a shift fork (also not shown). The sliding sleeve 28, which is free to move axially on the hub splines 34, is in engagement with the shift fork pads 100 and moves with them. The axial motion of the sliding sleeve causes the spring housing to move by virtue of the protrusions 72 on the sliding sleeve, which protrusions engage the associated groove 80 on the spring housings 64. This motion forces one of the synchronizer cones 42 into engagement with its associated synchronizer ring 24 with the external conical surface 43 of the synchronizer cone engaging the internal conical surface 26 of the ring.

When the synchronizer cone 42 and synchronizer ring 24 are caused to initially engage each other at dissimilar speeds, an index torque is created which initially rotates or indexes the reduced diameter portion 46 of the blocking pins 40 against the sides of the apertures 56 in the flange portion 58 of the sliding sleeve 36. Further movement of the sliding sleeve towards the synchronizer ring 24 is thus initially blocked because the chamfered portion 54 of the blocking pins 40 are engaged by the chamfered sides 60 of the apertures 54. As the sliding sleeve 36 and hub 28 reach the speed of the gear to be engaged, the shift force exerted by the sliding sleeve 36 moves the blocking pins 40 aside so that the spline 38 on sliding sleeve can engage the clutch teeth 22 on the gear assembly. Stated in another way, the axial force exerted on the chamfer 54 of the blocking pins by the chamfered portion 60 of the sliding sleeve produces a push-through torque which is opposed to the index torque. The blocking action continues until the index torque value drops below the push-through torque value, which occurs when synchronization is substantially achieved and the acceleration portion of the index torque is substantially reduced. As synchronization occurs, the synchronizer cones 42 and the blocking pins 40 rotate relative to the sliding sleeve which permits the sliding sleeve to move over the blocking pins while compressing the leaf springs 68 within the spring housing 64. This occurs when the protrusion 72 rides out of the groove 80 forcing the housing 64 upwardly towards the base plate 60 thereby compressing the springs 68. It is essential that the initial rotation of the synchronizer cone 42 and the blocking pins 40 occur before the springs 68 are compressed, thus the magnitude of the required axial force (to produce index torque) must be less than the force of the springs so that the desired indexing rotation occurs and not deflection of the springs 68.

In order to complete the shift it is essential that the springs 68 be compressed so that the protrusion 72 can move out of the groove 80 in the spring housing 64, and the sliding sleeve 36 can move to engage the clutch teeth 22 with the internal splines 38.

As can be seen from the above, it is essential that proper spring force be achieved in this design in order to insure successful operation. The present design utilizes leaf springs 68 which act on flat surfaces, namely the radial outer planar surface 78 of the spring housing 64 and the radially inner surface of the base plate 66. This design assures that only bending stresses (compression or tension) are present, and not bending plus torsion as in other existing designs. The advantages of removing the torsional loading includes an increased spring service life, a more predictable load for the indexing operation, and a more reliable operation. The present design achieves maximum use of springs in a minimum package volume leading to a synchronizer design of high torque capacity in a minimum envelope size.

While a preferred structure in which the principles of the present invention have been incorporated is shown and described above, it is to be understood that the invention is not to be limited to the particular details, shown and described above, but that, in fact, widely differing means may be employed in the practice of the broader aspects of this invention.

What is claimed is:

1. A synchronizer mechanism capable of selectively connecting either of two gears to a shaft upon which they are rotatably mounted, the synchronizer mechanism comprising a sliding sleeve interconnected with said shaft for rotation therewith, the sliding sleeve having a plurality of apertures, a pair of synchronizer rings which are rigidly joined together by at least two blocker pins extending through certain of said apertures, and at least two spring assemblies extending through other of said apertures, said synchronizer mechanism being characterized by each of said spring assemblies comprising a generally rectangular spring housing disposed between said pair of synchronizer rings, an elongated base plate, and spring means disposed between the base plate and a portion of the spring housing, said pair of synchronizer rings being provided with opposed recesses which unrotatably receive opposed ends of the base plate, said spring means including a pair of elongated opposed leaf springs, the ends of which are in contact with each other, and a midportion of each of the leaf springs being in contact with an intermediate surface of either the base plate or the spring housing, and in which each of said spring housings has a base portion and opposed sides extending away from the base portion at generally right angles, the associated base plate and spring means being disposed between said opposed sides.

2. A synchronizer mechanism capable of selectively connecting either of two gears to a shaft upon which they are rotatably mounted, the synchronizer mechanism comprising a sliding sleeve interconnected with said shaft for rotation therewith, the sliding sleeve having a plurality of apertures, a pair of synchronizer rings which are rigidly joined together by at least two blocker pins extending through certain of said apertures and the sliding sleeve having a plurality of radially outwardly extending protrusions associated with the other of said apertures, said synchronizer mechanism further being characterized by at least two spring assemblies extending through said other apertures, each of said spring assemblies comprising a generally rectangular spring housing sandwiched entirely between adjacent faces of said pair of synchronizer rings, a base plate of greater length than said spring housing, and spring means disposed between the base plate and a portion of the spring housing, the spring housing further being provided with a groove on the side opposite said spring means, each of the protrusions engaging an associated groove when the synchronizer mechanism is in a neutral position, and said pair of synchronizer rings being provided with opposed recesses which non-rotatably receive opposed ends of the base plate, each of the opposed recesses being provided with an upper surface extending in a plane generally at right angles to the diameter of the associated ring, the parts being so arranged and constructed that end surfaces of the base plate being biased into contact with associated upper wall surfaces whereby rotational movement of the spring assembly is prevented.

3. A synchronizer mechanism capable of selectively connecting either of two gears to a shaft upon which they are rotatably mounted, the synchronizer mechanism comprising a sliding sleeve interconnected with said shaft for rotation therewith, the sliding sleeve having a plurality of apertures, a pair of synchronizer rings which are rigidly joined together by at least two blocker pins extending through certain of said apertures, and at least two spring assemblies extending through other of said apertures, said synchronizer mechanism being characterized by each of said spring assemblies comprising a generally rectangular spring housing disposed between said pair of synchronizer rings, each of said spring housings having a base portion and opposed generally parallel sides extending away from the base portion, each of the sides being provided with an intermediate slot, an elongated base plate provided with outwardly extending tabs received within slots in the sides of an associated spring housing, and spring means disposed between the base plate and a portion of the spring housing, said spring means including a pair of elongated leaf springs each being provided with outwardly extending tabs also received within slots of an associated spring housing, the ends of the opposed leaf springs being in contact with each other, and said pair of synchronizer rings being provided with opposed recesses which non-rotatably receive opposed ends of the base plate.

4. The synchronizer mechanism as defined in claim 10 in which each of the base plates is formed of rigid sheet-like material having opposed parallel surfaces, the mid-portion of one of the leaf springs being in contact with either an intermediate surface of the spring housing or an intermediate portion of one of said opposed surfaces of said base plate, the ends of the other parallel surface of the base plate being maintained in non-rotatable contact with surfaces of a pair of opposed recesses which non-rotatably receive opposed ends of the base plate.

5. A synchronizer mechanism as defined in claim 2 or 3 in which each of the opposed recesses is provided with an upper wall surface extending in a plane generally at right angles to the diameter of the associated synchronizer ring, end surfaces of the base plate being biased into contact with associated upper wall surfaces whereby rotational movement of the spring assembly is prevented.

6. A synchronizer mechanism as defined in claim 2 or 3 in which the sliding sleeve is provided with a plurality of radially outwardly extending protrusions, and in which each of said spring housings is provided with a groove, each of the protrusions engaging an associated groove when the synchronizer is in a neutral position.

* * * * *